T. A. GALT & G. S. TRACY.
TOOTH-FASTENING FOR HORSE HAY-RAKE.
No. 171,790. Patented Jan. 4, 1876.
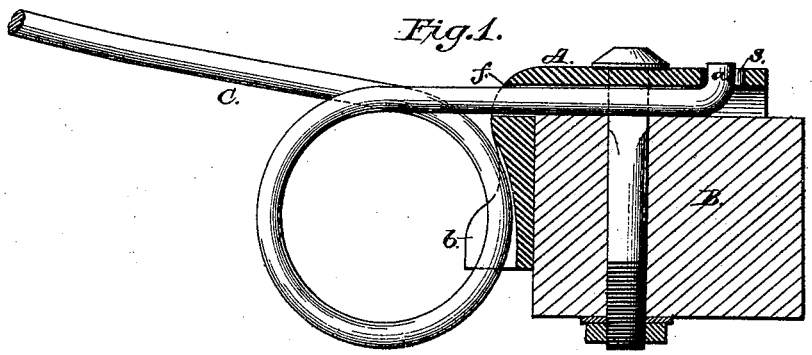
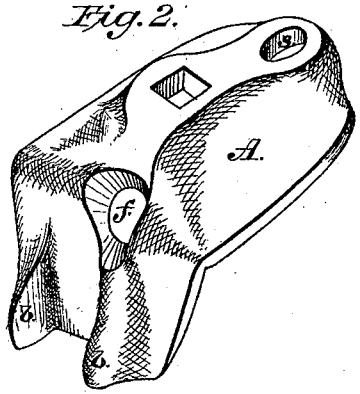
Attest:
John W. Alexander
H. C. Ward
Inventor:
Thomas A. Galt
Geo. S. Tracy

UNITED STATES PATENT OFFICE.

THOMAS A. GALT AND GEORGE S. TRACY, OF STERLING, ILLINOIS.

IMPROVEMENT IN TOOTH-FASTENINGS FOR HORSE HAY-RAKES.

Specification forming part of Letters Patent No. 171,790, dated January 4, 1876; application filed May 26, 1875.

*To all whom it may concern:*

Be it known that we, THOMAS A. GALT and GEORGE S. TRACY, of Sterling, in the county of Whitesides and State of Illinois, have invented certain new and useful Improvements in Hay and Straw Rakes, of which the following is a specification:

Our invention relates to a simple, complete, and effectual mode of fastening the teeth of a spring-tooth horse-rake to the head of such rake.

Figure 1 represents a section of such rake-head with our improvement in use. Fig. 2 shows the clamp A detached from the rake-head.

B is a section of the rake-head of that class of horse-rakes which are mounted on two wheels, and sometimes called "sulky-rakes." No more of the rake-head is shown than is necessary to exhibit the mode of fastening the teeth. C is a portion of one of the spring-teeth of such rake, showing only the end at which it is attached to the rake-head. A is a clamp, more conveniently made of cast-iron, and fitted to the under and the rear side of the rake-head. The clamp A is provided with a hole at $f$ and another at S, and is further provided externally with the jaws $b\ b$. The front end of the tooth C is passed through the hole in the clamp A at $f$, and downward through the front hole of the clamp at $s$, the clamp having a depression in its upper side from $f$ to S to permit the tooth to pass under without necessitating cutting into the rake-head B. The tooth C is bent downward at or near a right angle at its front end $a$, so as to penetrate through the hole in clamp at $s$. The jaws $b\ b$ of the clamp A are so placed as to inclose between them the tooth C where the latter is coiled. The tooth C is thus given three bearings—to wit, at $s$, at $f$, and at the jaws $b\ b$—and is prevented from twisting or changing its position relative to the rake-head or to the other rake-teeth. By passing an ordinary bolt up through the clamp and rake-head, and fastening the same by means of a nut on the end of the bolt, and on the upper side of the rake-head, as shown, the clamp is firmly attached to the rake-head and the tooth C held rigidly in place.

The advantages of our invention, aside from the firmness with which the tooth is held in place, are, first, the simplicity of the attachment, also the fact of there being but one hole in the rake-head for each tooth, thus in the least possible degree weakening the rake-head. Also, the convenience of placing or removing a tooth in case of injury or breakage, it being necessary only to remove the nut and withdraw the bolt. As the nuts are all on the upper side of the rake-head, the driver can readily see if any become loose, and such location of the nuts renders their removal or fastening more convenient.

We claim as our invention—

The within-described grooved rake-tooth clamp A, formed with perforations $f$ and S for receiving the rake-tooth, and lugs or projections $b\ b$ for receiving and steadying the bend of said rake-tooth, substantially as and for the purpose set forth.

THOMAS A. GALT.
GEO. S. TRACY.

Witnesses:
JOHN W. ALEXANDER,
H. C. WARD.